9040X
D. WILKINSON.
CANAL LOCK GATE.
Patented Aug. 17, 1835.
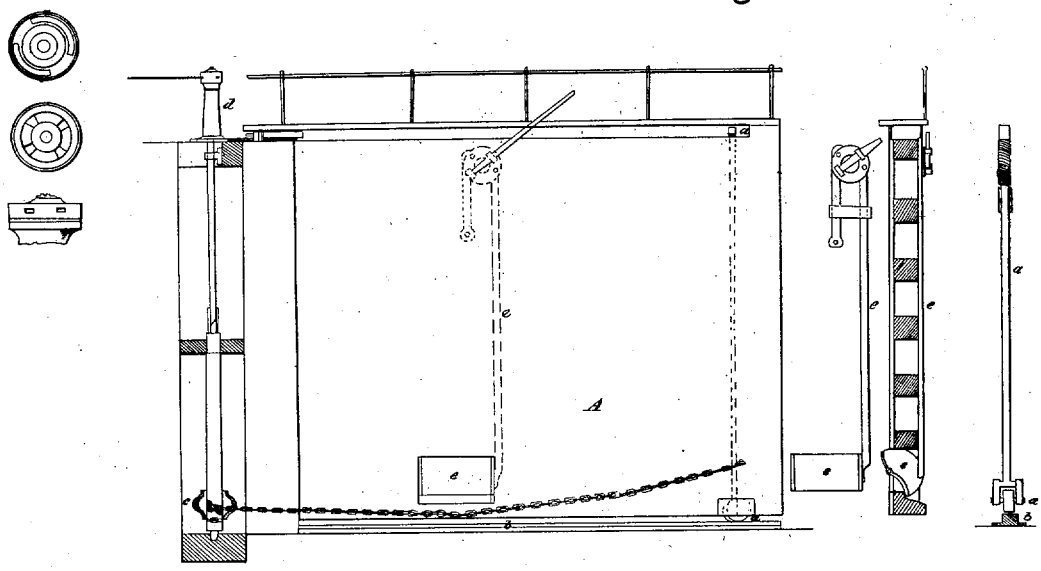
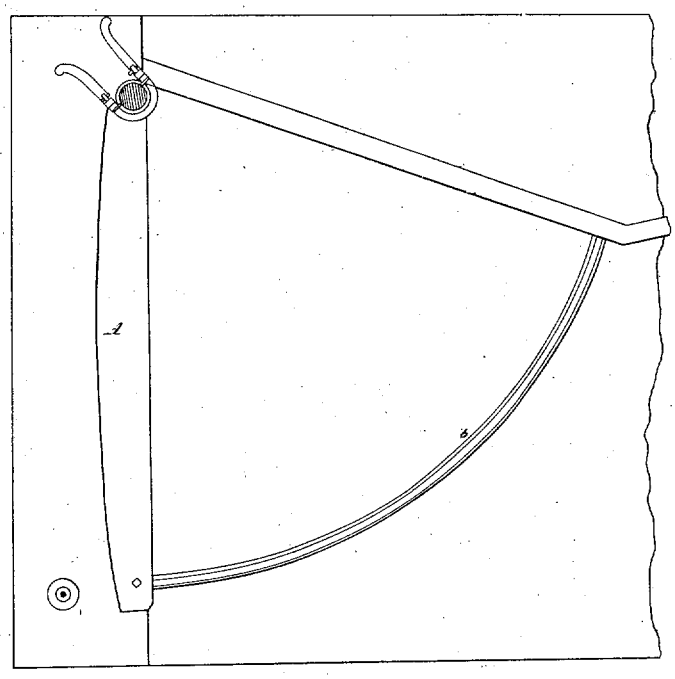
THE NORRIS PETERS CO., PHOTO-LITHO., WASHINGTON, D. C.

9040X Aug. 17 1835

David Wilkinson of Albany New York

Letters Patent

The Schedule referred to in these Letters Patent and making part
of the same containing a description in the words of the said
David Wilkinson himself of his improvement in Gates for Can[al]
Locks.

Be it known that I David Wilkinson of Cohoes ...
Albany County, State of New York, have made an improve-
ment in Gates for Canal Locks, which is described as follows.
The Gate is constructed in the usual manner. The improvements
consist in the mode of adjusting the friction Roller to the quadrant
or circular rail way - the rider to guide the chain on the capstan - [illegible]
ratchet or pall in the head of the capstan to prevent its being turne[d]
in a wrong direction, and the self adjusting valve gate. The friction ro[ll]
er is adjusted by means of a slide bar passing through the wooden
bars of the Gate bearing on a sliding frame or box which contains th[e]
friction Roller. This rod is raised or lowered by a nut and screw o[n]
the top of the rod. The mode of suspension may be various to sui[t]
circumstances. The rider placed at the bottom of the capstan - to guide
the chain on the capstan is constructed by having a thimble to pass
around the drum, the under edge of which is made in a spiral form
with a tube attached to the same through which the chain passes,
The top of the capstan into which the lever is inserted is made so as
to contain a click or pall against which the lever may catch this
will prevent its ever being turned the wrong way. The self adju[s]
ting valve gate is constructed so as to open by the pressure of the wa[ter]
To effect this the gate is hung by a hinge bar or joint. There are on[e]
or more connecting rods fixed on the back side of the main gate at
tached to the lower edge of the valve and extending to the top of
the gate which are held down by a screw at the top; or they may
be held down by any other means. The valve Gate may be placed
vertically as may be deemed convenient in some cases. Or the
valve gate may drop by the force of the water and close upward by

9040X the force of the screw or lever. Operation. When the Gate is shut it moves along the quadrant or circular rail way by the use of the chain and capstan. The lock being full of water. the catch on the screw which holds down the valve gate is detached and the screw being so graduated as to travel by the force of the water. the pressure of water opens the valve which gives motion to the screw. When the screw is sufficiently high another pall falls into gear and holds it up. When the water is equalized in the upper and lower locks the screw by its own weight closes the valves and the pall holds it fast till detached by hand or the pall may be dispensed with and the screw may be so graduated as to remain stationary without the assistance of the pall or catch.

The invention here claimed and desired to be secured by Letters Patent consists in the before described mode of adjusting the friction Roller in the quadrant or circular rail way the rider to guide the chain on the capstan — the open head with palls of the capstan and the self adjusting valve gate Exd. Witnesses
[illegible] H. A. Elliot
[illegible] Smith David Wilkinson (624 words)

(Granted August 17. 1835)

Drawing Made